March 23, 1954     A. E. INCLEDON     2,672,796
TWO-FILM CAMERA

Filed Jan. 22, 1951     2 Sheets-Sheet 1

Arthur E. Incledon
INVENTOR.

BY *Clarence A. O'Brien*
*and Harvey B. Jacobson*
Attorneys

March 23, 1954     A. E. INCLEDON     2,672,796

TWO-FILM CAMERA

Filed Jan. 22, 1951     2 Sheets-Sheet 2

Arthur E. Incledon
        INVENTOR.

BY

Patented Mar. 23, 1954

2,672,796

UNITED STATES PATENT OFFICE 2,672,796

TWO-FILM CAMERA

Arthur E. Incledon, St. Albans, N. Y.

Application January 22, 1951, Serial No. 207,114

5 Claims. (Cl. 95—31)

This invention comprises novel and useful improvements in cameras and more particularly pertains to a plural film type camera.

An important object of this invention is to provide a plural roll film camera in which each of the rolls of film may be selectively advanced past an exposure frame, and in which each of the films may be selectively positioned in registry with a single lens and shutter assembly.

Another object of this invention is to provide a plural film holder in accordance with the foregoing object, in which the roll film holders and film winding spools are carried by a rotatable carriage; with a combined light seal and carriage stop mounted on the carriage to lock the carriage with one exposure frame thereof in proper registry with the camera lens and seal that film against light entering from the back of the camera; which carriage stops hold the film disposed in the other exposure frame in registry with the door on the back of the camera so that the latter film may be removed from the camera after it has been exposed and rewound into the film case.

An important feature of this invention resides in the provision of a camera casing having a carriage rotatably mounted therein with a pair of exposure frames on the carriage together with a separate roll film holder and film winding spool for each of the exposure frames for advancing the film thereby, which spools and film holders are disposed parallel to the axis of rotation of the carriage with the knobs for actuating the spools and holders carried by the ends thereof which project through the end walls of the carriage.

Another important feature of this invention resides in the provision of a plural film camera in accordance with the foregoing feature together with a transverse partition extending diametrically of the end walls of the carriage, and combined light seals and carriage stops carried by the ends of the partition to lock the same with one exposure frame in registry with the camera lens and shutter assembly and sealed against light other than that entering through the lens, while the film in the other exposure frame can be removed through a door on the back of the camera without exposing the film in registry with the camera lens to the light entering through that door.

A further feature of this invention resides in the provision of a plural film camera in accordance with the foregoing features with an improved light sealing strip rotatably coupling the carriage end walls to the camera casing.

Yet another feature of this invention resides in the provision of plural film camera having an improved mount for the roll film holders and film winding spools, and which camera is so constructed that the film spools and holders are disposed parallel to the axis of rotation of the rotatable carriage whereby a frame counter may be mounted on the end walls in operative engagement with each of the roll films.

These, together with various ancillary objects and features are attained by this device, a preferred embodiment of which has been illustrated in the accompanying drawings wherein.

Figure 1:
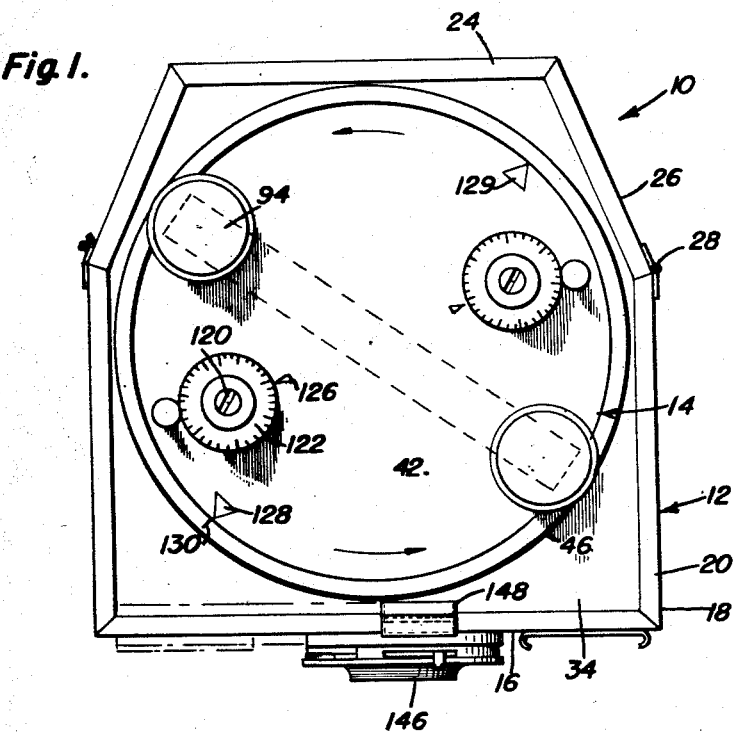
Figure 1 is a top plan view of the plural film camera.
Figure 2:
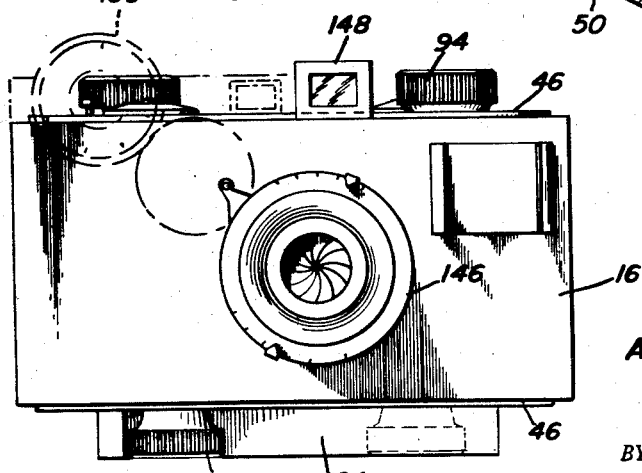
Figure 2 is a front elevational view of the plural film camera.
Figure 6:
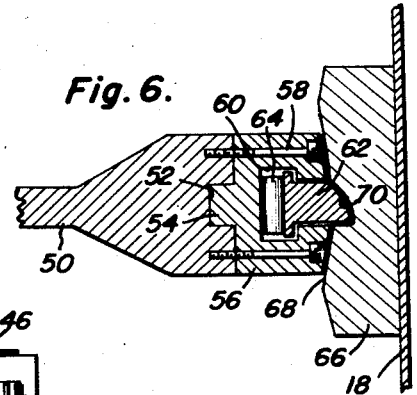
Figure 6 is an enlarged horizontal sectional view of the combined carriage stop and light seal.

Reference is now made more specifically to the accompanying drawings wherein the plural film camera, denoted generally by the numeral 10, is illustrated, which camera includes a casing 12 and a relatively rotatable carriage 14.

The casing 12 includes upstanding front and side walls 16 and 18 respectively, each of which have inwardly directed flanges 20 and 22 on their upper and lower edges respectively. A U-shaped back wall 24 has inwardly directed flanges 26 on the upper and lower edges thereof, and is swingably attached to one of the side walls 18, as by hinges 28, the other end of the back wall being detachably locked to the other side wall as by the resilient latch finger 30 which engages the detent 32. Upper and lower front end wall plates 34 and 36 are respectively secured to the side and front walls of the casing 12, which upper and lower plates respectively underlie and overlie the flanges 20 and 22 on the front and side walls whereby these flanges constitute a light seal. As will be appreciated, the flanges 26 on the back wall also engage the outer faces of the upper and lower plates, in light sealing engagement therewith.

The upper and lower plates are each provided with enlarged circular openings 38 and 40 respectively, which openings are disposed coaxially of each other and receive the end walls 42 and 44 of the carriage 14. Circular light sealing strips 46, of Z-shaped cross section are secured to the upper and lower front end walls 34 and 36 about the periphery of the opening 38 and 40 therein, one leg of which strips engage the inner face of the upper and lower walls, while an opposed parallel leg engages the outer face of the end walls of the carriage. As will be noted, the strips 46 not only seal the juncture of the upper and lower walls with the end walls against light, but, in addition serve to rotatably retain the carriage end walls in position. A suitable light sealing gasket 48 of felt or the like may be secured to the periphery of the end walls, which gasket slidably engages the web of the Z-shaped strip 46.

A transverse partition 50 is secured between the end walls 42 and 44 and extends diametrically thereof. The ends of the portion are provided with slots 52 for the reception of the light sealing keys 54 on the blocks 56 which are secured to the ends of the partition by fasteners 58. The blocks 56 have T-slots 60 extending longitudinally thereof for the reception of the flanged carriage stops and light sealing bars 62. A leaf spring 64 is disposed in the T-slot 60 and engages the bars 62 to yieldingly bias the same outwardly of the slot. Stop members 66 having an arcuate face 68 disposed concentric with the axis of rotation of the carriage are secured to the side walls 18, and are provided with a seat forming recess 70 for the reception of the bars 62. As will be noted, the mating faces of the bars 62 and recess 70 are complementary to each other to provide an efficient light seal when the bars are disposed in the recesses, and that the bars are so shaped as to be cam actuated, by engagement with the walls of the recess, into the T-slots as the carriage is rotated. A felt pad 71 is carried by the upper and lower plates and abuts the ends of the bars 62 in sliding light sealing engagement therewith.

An exposure frame 72 is secured between the end walls 42 and 44 of the carriage, on both sides of the partition 50, and each of the exposure frames comprises a windowed plate member in the focal plane of the lens and integral therewith light shaft plates 74 and 76 extending outwardly therefrom. The exposure frame thus delineates and shuts off a prismatic exposure chamber extending in a substantially radial direction from a plane near the partition toward the periphery of the cylinder formed by the rotatable structure held between the end plates. Arcuate light shields 78 and 80 are integrally formed with the plates 74 and 76, the shield 78 having an inwardly directed flange 82 thereon which engages a conventional roll film holder 84. A resilient arm 86 engages the roll film holder and releasably retains the latter in engagement with the finger 82 and shaft plate 74. A film winding spool 88 has the lower end thereof journaled in a boss 90 on the end wall 44, the upper end of the film winding spool being detachably keyed to the reciprocable stub shaft 92 carried by the winding knob 94, in a conventional manner. A resilient finger 98 is carried by the shaft plate 76 and is adapted to engage the film 100 rolled on the spool 88 to retain the same taut on the spool. Obviously, the shield 80 may be provided with a recess 102 to facilitate attaching the end of the film 100 on the spool 88, and the shield 78 may have a finger recess 104 to facilitate insertion and removal of the film holder 84.

A film rewind knob 106 has a slotted shaft 108 thereon which is reciprocably mounted for movement into and out of driving engagement with roll film holder, as is conventional. Counter shafts 110 are rotatably disposed in journals on the upper and lower carriage end walls 42 and 44, which shafts carry sprockets 112 which mesh with the film tracks 114 whereby the counter shafts are rotated as the film is advanced. A spur gear 116 on each counter shaft meshes with a similar gear 118 on the slotted stub shaft 120 whereby the latter is driven by the counter shaft. A counter wheel 122 having frame indicating indicia thereon is frictionally mounted on the externally projecting end of the stub shaft 120 so that the counter wheel may be turned relative to the stub shaft without turning the gear 118 carried by the latter to permit resetting of the frame counter wheel when a new film is inserted in the camera. Obviously, the sprockets 112, gears 116 and 118 and counter wheel 122 are so constructed that the counter wheel will properly register when a new section of the film roll is positioned in registry with the exposure frame.

A carriage rotating handle member 124 is carried by the end wall 44 to facilitate turning of the carriage and further serves as a support upon which the camera may be rested, when desired. Further, an arrow 126 may be provided on the end wall 42 to coact with the indicia on the counter wheel to indicate the frame member, while arrows 128 and 129 may be provided adjacent the periphery of the end wall 42 to register with the indicia 130, and indicate when the carriage is in proper position relative to the casing. Obviously, the arrow 128 may be of a color, such as red, and the arrow 129 of a different color, such as black, whereby the arrows 128 and 129 may further serve as a key to the type of film disposed in the respective sides of the carriage upon which the arrows are disposed.

Figure 3:
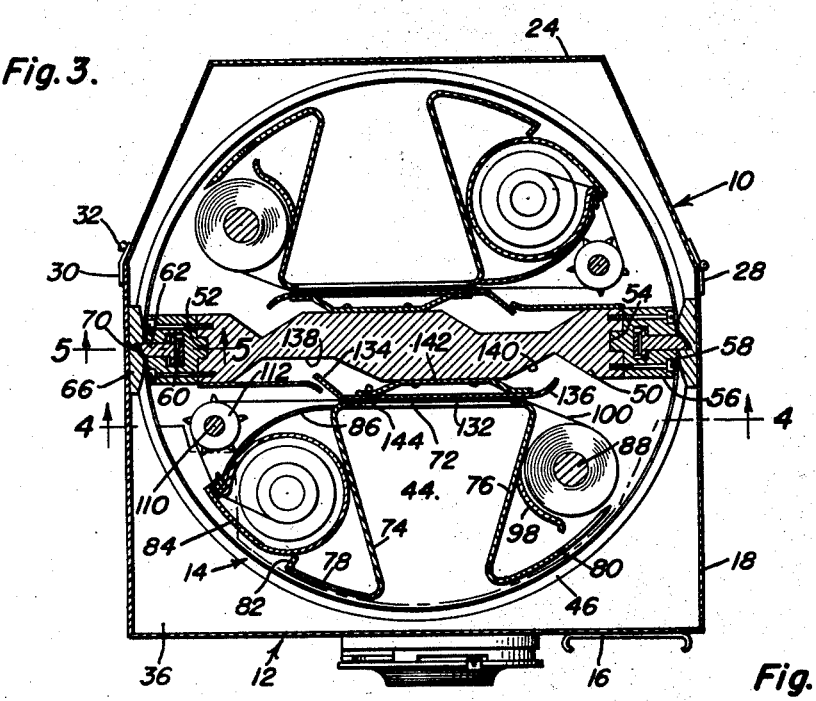
Figure 3 is a horizontal sectional view of the camera, taken on the plane 3—3 of Figure 4.
Figure 4:
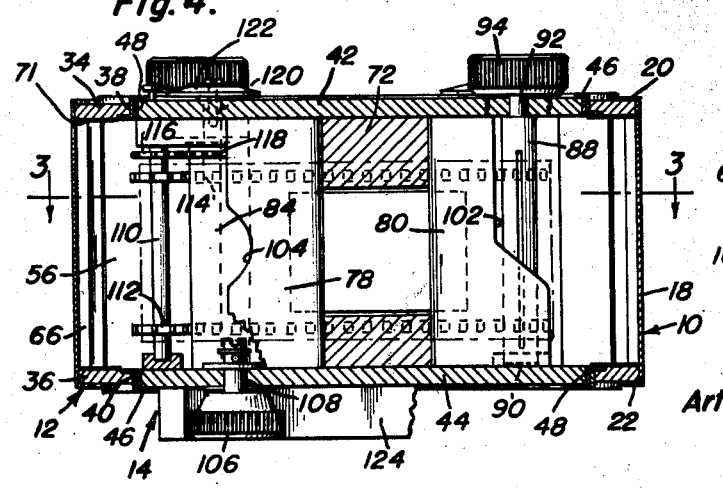
Figure 4 is a vertical sectional view taken on the plane 4—4 of Figure 3.
Figure 5:
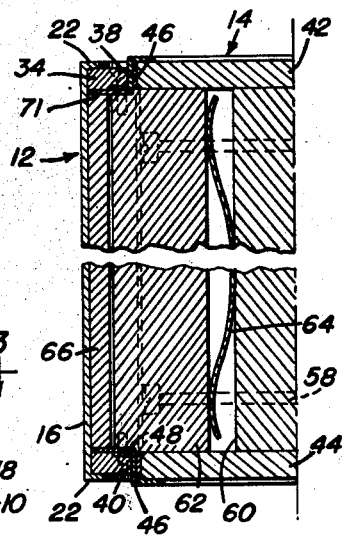
Figure 5 is an enlarged fragmentary vertical sectional view taken on the plane 5—5 of Figure 3.

In order to yieldingly retain the film 100 against the exposure frames 72, there is provided a presser plate 132 having angularly offset end portions 134 and 136 which are respectively movable into and out of recesses 138 and 140 in the partition 50. The intermediate portions of the leaf spring 142 are secured to the partition 50 and one end thereof is secured to the presser plate 132 as by fasteners 144, the other end of the leaf spring 142 slidably engaging the presser plate, as is clearly apparent from Figure 3.

As is conventional, the front wall 16 of the casing may be provided with a lens and shutter assembly 146 and a view finder 148, of any desired construction. A range adjusting wheel 150 is operatively connected to the lens assembly in a known manner.

From the foregoing it will be noted that the carriage 14 and film rolls carried thereby may be rotated so as to align either one of the exposure frames with the lens and shutter assembly, and that the back may swing into its open position to permit reloading of the camera. Further, when the back is open, the combined light seals and carriage stops 62 will prevent unwanted exposure of the film which is disposed in registry with the lens and shutter.

Since the roll film holders and winding spools are journaled between the end walls of the carriage, parallel to axis of rotation of the carriage, the actuating knobs therefor and the counter wheel may be disposed directly on the externally projecting ends of their corresponding shafts.

Having described the invention, what is claimed as new is:

1. A plural film holding camera, comprising a casing having a front wall carrying an optical system including a lens and a shutter mechanism, side walls, and two fixed apertured top and bottom walls, circular rotatable top and bottom walls mounted on and within the said fixed apertured top and bottom walls, a diametrically extending partition, normally in a vertical plane when the camera is in use and the axis of the optical system is in a horizontal position, secured to and joining the said circular rotatable top and bottom walls, a pair of exposure frames attached between said circular rotatable top and bottom walls on opposite sides of said partition, first and second roll film holders mounted between the top and bottom walls on opposite sides of said partition, first and second film winding spools rotatably mounted between said top and bottom walls on opposite sides of said partition, the axis of said spools and film holders being disposed parallel to the axis of rotation of said rotatable top and bottom walls, means carried by said last named walls, externally of said casing, advancing the film past the exposure frames, elongated wiper bars secured to the ends of said normally vertical partition and extending between said top and bottom walls, seating members provided with recessed seats on said side walls for receiving said bars, and means yieldingly biasing said bars into said recessed seats to lock said rotatable walls to said casing with one of the exposure frames held in registry with said lens and shutter, said bars being arranged as to form a light seal between said partition and side walls, Z-shaped light sealing strips, each strip being mounted within an apertured fixed end wall within which a rotatable end wall is held, and each strip having the web portion thereof disposed between the adjacent edges of the fixed end wall and the rotatable end wall, and the leg portion of each strip extending in opposite directions in overlying relation with the fixed and rotatable end walls.

2. A plural film holding camera as claimed in claim 1, wherein the web portions of said strips are secured to the fixed apertured end walls and a light sealing pad is disposed between the web portions of the sealing strips and their adjacent edges of the rotatable end walls.

3. A plural film holding camera comprising a casing having a front wall carrying an optical system, including a lens and a shutter mechanism, and a side wall, fixed apertured top and bottom walls, circular rotatable top and bottom walls mounted on and within said fixed top and bottom walls, a diametrically extending partition arranged in a normally vertical plane when the camera is in use and the axis of the optical system is in a horizontal position, secured to said rotatable top and bottom walls, a pair of exposure frames attached between said top and bottom walls on opposite sides of said partition, first and second roll film holders mounted between said top and bottom walls on opposite sides of said partition, first and second film winding spools rotatably mounted between said top and bottom walls on opposite sides of said partition, the axes of said spools and film holders being disposed parallel to the normally vertical axis of rotation of said rotatable top and bottom walls, means carried by said top and bottom walls, externally of said casing, for advancing the film past said exposure frames, said partition being provided with T-shaped slots therein, each slot opening being disposed in one of the opposed ends of said partition, T-shaped wiper bars disposed in each of said slots and extending outwardly of the ends of said partition, spring means disposed in said slot and pressing on said bars, seating members provided with recessed seats attached to said side walls of the casing, the said wiper bars when entering into said recessed seats locking said end walls against rotation with the exposure frames in registry with the lens and providing a light tight seal.

4. A plural film holding camera comprising a casing having a front wall carrying an optical system and shutter mechanism, side walls, and two fixed top and bottom walls each provided with a circular opening, rotatable circular top and bottom wall members within said openings mounted on and within said two fixed top and bottom walls, rotatable around an axis which is normally vertical during use of the camera and at right angles to the optical axis of the optical system, said rotatable top and bottom wall members being joined by a substantially flat partition arranged along a diameter of the rotatable top and bottom wall members, a subdividing structure carried on each side of the partition wall, subdividing the substantially semi-cylindrical space contained between the partition wall and the periphery of a cylinder having the circular opening of the two fixed top and bottom walls at its base, said subdividing structure including a windowed plate member arranged in substantial parallelism with and near the partition wall, light shaft plates projecting towards the periphery of the cylinder from said base and enclosing between their inner sides a central prismatic space, roll film holding means mounted near said light shaft plates on the outer sides thereof, the roll film holding means being at a radial distance from the axis of rotation exceeding that of the windowed plate, means carried by said top and bottom walls on the outside of the casing for advancing a roll film, and means for selectively locking said partition when rotated past the optical system within the side walls of said casing in a position in which one of the windowed plates and prismatic spaces in front of it face the optical system, the aforesaid windowed plate being then positioned in the focal plane of the optical system.

5. A plural film holding camera comprising a casing having a front wall carrying an optical system, including a lens and a shutter mechanism, side walls, and two fixed apertured walls, forming the top and bottom walls of the camera respectively, rotatable circular top and bottom wall members mounted on and within the apertured fixed top and bottom walls for rotation about an axis which is substantially vertical when the camera is in use and the optical axis of the lens is horizontal, a diametrically extending substantially flat partition positioned in a vertical plane when the camera is used, secured to and joining the said rotatable top and bottom wall members, a pair of exposure frames with a planar windowed plate member and light shaft plates, the latter projecting from said windowed planar member outwardly, the two exposure frames being arranged on opposite sides of the substantially flat partition, with the planar windowed plate member in close proximity to the partition, a roll film holder and a film winding spool arranged between said rotatable top and bottom wall members on each side of the partition, the axes of said spool and said film holder being parallel to the axis of rotation of said circular rotatable top and bottom wall members and the roll film holder and film winding spool which are disposed at one side of the partition being arranged behind the light shaft plates on opposite sides of the space enclosed between said light shaft plates respectively, means carried by said top and bottom wall members externally of said casing for advancing the film past said exposure frames, elongated wiper bars secured to the ends of said partition and extending between the top and bottom wall members, seats on said side walls for receiving said bars, means yieldingly biasing said bars to their seats to lock said rotatable top and bottom wall members to said casing, with a planar windowed plate member of one of said exposure frames disposed in registry with said lens and shutter at a radial distance from the same which is substantially equal to that of the flat partition from the lens, the light shaft plates shutting off the space within which the exposure of the film occurs on both sides, and said bars being so arranged that they form a light tight seal between said partition and said side walls of the casing.

ARTHUR E. INCLEDON.

References Cited in the file of this patent
UNITED STATES PATENTS

| Number | Name | Date |
|---|---|---|
| 2,439,112 | Teague | Apr. 6, 1948 |
| 2,507,926 | Noble | May 16, 1950 |